United States Patent
Kim et al.

(10) Patent No.: US 9,584,386 B2
(45) Date of Patent: Feb. 28, 2017

(54) NODE UNIT CAPABLE OF MEASURING DELAY AND DISTRIBUTED ANTENNA SYSTEM INCLUDING THE SAME

(71) Applicant: SOLiD, INC., Seongnam-si, Gyeonggi-do (KR)

(72) Inventors: Hyoungho Kim, Seoul (KR); Doyoon Kim, Bucheon-si (KR); Yeongshin Yeo, Gwangmyeong-si (KR)

(73) Assignee: SOLID, INC., Seongnam-si (KR)

( * ) Notice: Subject to any disclaimer, the term of this patent is extended or adjusted under 35 U.S.C. 154(b) by 0 days.

(21) Appl. No.: 15/080,084

(22) Filed: Mar. 24, 2016

(65) Prior Publication Data

US 2016/0205006 A1 Jul. 14, 2016

Related U.S. Application Data

(63) Continuation of application No. PCT/KR2014/013103, filed on Dec. 31, 2014.

(30) Foreign Application Priority Data

Dec. 30, 2014 (KR) ........................ 10-2014-0194366

(51) Int. Cl.
| | |
|---|---|
| H04L 12/26 | (2006.01) |
| H04B 7/04 | (2006.01) |
| H04W 24/06 | (2009.01) |
| H04B 7/02 | (2006.01) |
| H04W 88/08 | (2009.01) |

(52) U.S. Cl.
CPC ......... *H04L 43/0864* (2013.01); *H04B 7/024* (2013.01); *H04B 7/04* (2013.01); *H04W 24/06* (2013.01); *H04W 88/085* (2013.01)

(58) Field of Classification Search
CPC ...... H04W 88/085; H04W 24/02; H04B 1/40; H04B 7/022; H04B 7/024
See application file for complete search history.

(56) References Cited

U.S. PATENT DOCUMENTS

| | | |
|---|---|---|
| 5,805,983 A | 9/1998 | Naidu et al. |
| 7,940,667 B1 * | 5/2011 | Coady ............... H04J 3/0691 342/102 |
| 7,948,897 B2 | 5/2011 | Stuart et al. |

(Continued)

FOREIGN PATENT DOCUMENTS

WO 2004/047472 A1 6/2004

OTHER PUBLICATIONS

International Search Report for PCT/KR2014/013103 dated Sep. 21, 2015.

*Primary Examiner* — Jung Park
(74) *Attorney, Agent, or Firm* — Sughrue Mion, PLLC

(57) ABSTRACT

A node unit of distributed antenna system, the node unit comprises a delay measuring part configured to transmit a first test signal for delay measurement to an upper adjacent node unit and detect the first test signal looped back via the upper adjacent node unit and measure a round trip delay between the node unit and the upper adjacent node unit, and a delay providing part disposed on a signal transmission path through which a second test signal for delay measurement, to be transmitted from a lower adjacent node unit, is to be looped back to the lower adjacent node unit, and configured to provide a delay corresponding to the round trip delay.

15 Claims, 5 Drawing Sheets

Delay A = ROUND TRIP DELAY BETWEEN MU AND RU #1
Delay B = ROUND TRIP DELAY BETWEEN MU AND RU #1 + BETWEEN RU #1 AND RU #2

(56) References Cited

U.S. PATENT DOCUMENTS

| | | |
|---|---|---|
| 8,743,718 B2 | 6/2014 | Grenier et al. |
| 8,855,036 B2 | 10/2014 | Sabat et al. |
| 2008/0194226 A1 | 8/2008 | Rivas et al. |
| 2012/0327789 A1* | 12/2012 | Grenier .................. H04L 43/10 370/252 |
| 2015/0304005 A1* | 10/2015 | Schmid ................ H04B 7/0491 455/422.1 |
| 2016/0192440 A1* | 6/2016 | Berg .................. H04W 88/085 455/126 |

* cited by examiner

NODE UNIT CAPABLE OF MEASURING DELAY AND DISTRIBUTED ANTENNA SYSTEM INCLUDING THE SAME

CROSS REFERENCE TO RELATED APPLICATIONS

This application is a Continuation of International Application No. PCT/KR2014/013103, filed Dec. 31, 2014, and claims priority from Korean Patent Application No. 10-2014-0194366 filed Dec. 30, 2014, the contents of which are incorporated herein by reference in their entireties.

BACKGROUND

1. Field

The inventive concept relates to a transmission delay measurement and more particularly, to a node unit capable of measuring a delay and a distributed antenna system including the same.

2. Description of Related Art

Delay equalization processing in a distributed remote device (e.g., a remote unit in a distributed antenna system, a remote radio head (RRH) in a base station distributed system, or the like) is required in a distributed transmission system for mobile communication signals, such as the distributed antenna system or the base station distributed system.

In particular, the delay equalization processing is important in an orthogonal frequency division multiplexing (OFDM)-based signal transmission system such as long term evolution (LTE) or WIBRO. In OFDM-based signals, it is important to maintain orthogonality between carrier wavers for performing a discrete Fourier transform (DFT) operation in a cell overlapping region. This is because, in order to maintain the orthogonality, it is required to provide mobile communication services through distributed remote devices at the same time.

Therefore, in a signal distributed transmission system, the accurate measurement of a transmission delay is required as a precondition of the delay equalization processing for improving the quality of mobile communication services.

SUMMARY

An embodiment of the inventive concept is directed to a node unit capable of measuring a delay and/or a distributed antenna system including the same.

According to an aspect of the inventive concept, there is provided a node unit of distributed antenna system, the node unit comprising: a delay measuring part configured to transmit a first test signal for delay measurement to an upper adjacent node unit and detect the first test signal looped back via the upper adjacent node unit and measure a round trip delay between the node unit and the upper adjacent node unit; and a delay providing part disposed on a signal transmission path through which a second test signal for delay measurement, to be transmitted from a lower adjacent node unit, is to be looped back to the lower adjacent node unit, and configured to provide a delay corresponding to the round trip delay.

According to an exemplary embodiment, the node unit may be a node unit connected to a main unit of the distributed antenna system.

According to an exemplary embodiment, the node unit may be any one remote unit among a plurality of first remote units connected to the main unit or a hub unit connected to the main unit to distribute the mobile communication signals to a plurality of second remote units connected the hub unit.

According to an exemplary embodiment, the node unit may further comprise a first framer/deframer for transmitting and receiving signals between the node unit and the upper adjacent node unit, wherein the delay measuring part configured to detect the first test signal looped back from the upper adjacent node unit through the first framer/deframer.

According to an exemplary embodiment, the node unit may further comprise a second framer/deframer for transmitting and receiving signals between the node unit and the lower adjacent node unit, wherein the delay providing part configured to provide the delay to the second test signal transmitted from the lower adjacent node unit through the second framer/deframer.

According to an exemplary embodiment, the node unit may further comprise a control part configured to set a value of the delay in accordance with a value of the measured round trip delay.

According to an exemplary embodiment, the control part may receive a delay measurement start signal from the upper adjacent node unit, and control measurement for the round trip delay to be started through the delay measuring part in response to the received delay measurement start signal.

According to an exemplary embodiment, after the measuring of the round trip delay through the delay measuring part and the providing of the delay to the second test signal through the delay providing part are completed, the control part may transmit the received delay measurement start signal to the lower adjacent node unit.

According to an exemplary embodiment, after the measuring of the round trip delay through the delay measuring part and the providing of the delay to the second test signal through the delay providing part are completed, the control part may generate a delay measurement start signal instructing the start of delay measurement at the lower adjacent node unit, and transmit the generated delay measurement start signal to the lower adjacent node unit.

According to another aspect of the inventive concept, there is provided a distributed antenna system including a main unit and a plurality of node units connected the main unit, wherein each of the plurality of node units may be implemented a node unit described above.

According to the inventive concept, in a signal transmission system in which communication node units for mobile communication services are branch-connected to each other, it is possible to automatically measure a transmission delay in the signal transmission system.

Also, according to the inventive concept, delay compensation can be performed by considering the measured transmission delay caused by the transport medium in the signal transmission system. Thus, it is possible to improve the quality of mobile communication services in the case of OFDM-based signal transmission such as LTE or WIBRO, in which it is particularly important to synchronize service times of mobile communication signals.

DETAILED DESCRIPTION OF EXEMPLARY EMBODIMENTS

Figure 1:
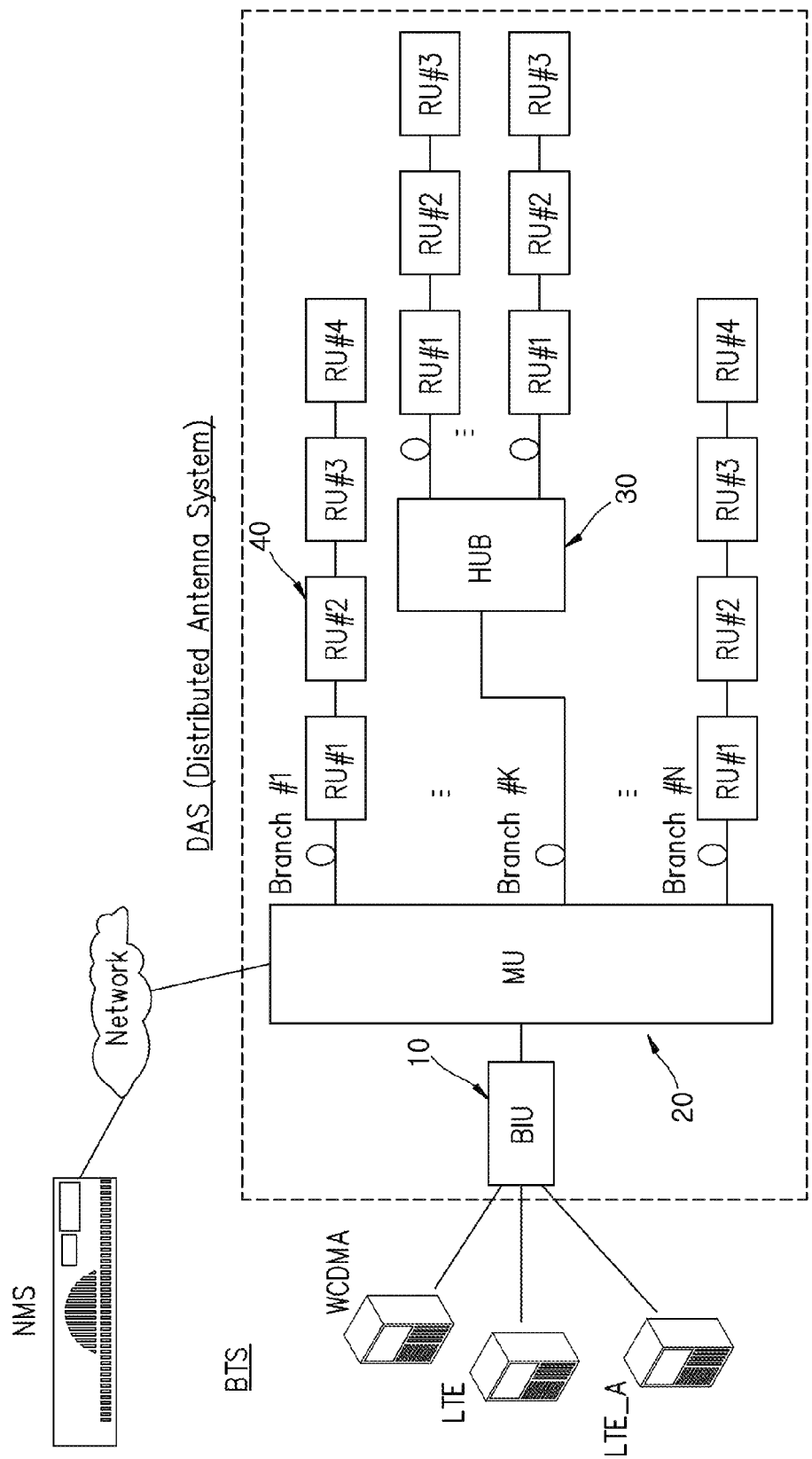
FIG. 1 is a diagram illustrating an example of a topology of a distributed antenna system as a form of a signal distributed transmission system to which the inventive concept is applicable.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

It is noted that the components of the inventive concept are categorized based on each main function that each component has. Namely, two or more than two component units, which will be described below, may be combined into one component unit or one unit may be classified into two or more than two component units for each function. Each of the component units, which will be described below, should be understood to additionally perform part or all of the functions that another component has, in addition to the main function that the component itself has, and in addition, part of the functions that each component unit has may be exclusively performed by another component unit.

Hereinafter, exemplary embodiments of the inventive concept will be described in detail with reference to the accompanying drawings.

Hereinafter, a distributed antenna system is applicable will be mainly described as an application example to which a delay measuring method according to an embodiment of the inventive concept. However, the embodiment of the inventive concept may be identically or similarly applied to another signal distributed transmission system such as a base station distributed system in addition to the distributed antenna system. Hereinafter, a remote unit disposed in the distributed antenna system as a communication node unit to which the delay measuring method according to the embodiment of the inventive concept is applied will be described as an example, but a hub unit in the distributed antenna system may also correspond to the communication node unit. Also, it will be apparent that a remote radio head (RRH) in the base station distributed system may correspond to the communication node unit.

FIG. 1 is a diagram illustrating an example of a topology of a distributed antenna system as a form of a signal distributed transmission system to which the inventive concept is applicable.

Referring to FIG. 1, the distributed antenna system (DAS) includes a base station interface unit (BIU) 10 and a main unit (MU) 20, which constitute a headend node unit of the DAS, a hub unit (HUB) 30 that is an extension node unit, and a plurality of remote units (RUs) 40 respectively disposed at remote service positions. The DAS may be implemented as an analog DAS or a digital DAS. When necessary, the DAS may be implemented as a hybrid of the analog DAS and the digital DAS (i.e., performance of analog processing on some node units and digital processing on the other node units).

However, FIG. 1 illustrates an example of the topology of the DAS, and the DAS may have various topologies in consideration of particularity of its installation area and application field (e.g., in-building, subway, hospital, stadium, etc.). As such, the number of the BIU 10, the MU 20, the HUB 30, and the RUs 40 and connection relations between upper and lower node units may also be different from those of FIG. 1. In the DAS, the HUB 30 is used when the number of branches to be branched in a star structure from the MU 20 is limited as compared with the number of RUs 40 required to be installed. Therefore, the HUB 30 may be omitted when only the single MU 20 sufficiently covers the number of the RUs required to be installed, when a plurality of main units 20 are installed, when a plurality of MUs 20 are installed, or the like.

Hereinafter, each node unit and its function in the DAS applicable to the inventive concept will be sequentially described based on the topology of FIG. 1.

The BIU 10 may perform an interface function between a base station transceiver system (BTS) such as a base station and the main unit 20 in the DAS. In FIG. 1, it is illustrated that a plurality of BTSs are connected to a single BIU 10. However, the BIU 10 may be separately provided for each provider, each frequency band, or each sector.

In general, a radio frequency (RF) signal transmitted to a BTS is a signal with high power. Therefore, the BIU 10 may convert the RF signal with high power into a signal with power suitable to be processed in the MU 20 and transmit the converted signal to the MU 20. According to an implementation method, the BIU 10, as shown in FIG. 1, may receive mobile communication service signals for each frequency band (or each provider or each sector), combine the received signals, and then transmit the combined signal to the MU 20.

When the BIU 10 converted a high-power signal from the BTS into a low-power signal, combines mobile communication service signals, and then transmits the combined signal to the MU 20, the MU 20 distributes the combined and transmitted mobile communication signal (hereinafter, referred to as 'relay signal') for each branch. In this case, when the DAS is implemented as the digital DAS, the BIU 10 may be separated into a unit for converting a high-power RF signal into a low-power RF signal, and a unit for converting a low-power RF signal into an intermediate frequency (IF) signal, performing digital signal processing on the converted IF signal, and then combining the digital signal processed signal. Alternatively, when the BIU 10 performs only the function of converting the high-power signal from the BTS into the low-power signal, the MU 20 may combine the transmitted relay signals and distribute the combined relay signal for each branch.

As described above, the combined relay signal distributed from the MU 20 is transmitted for each branch (see Branch #1, . . . , Branch #k, . . . , Branch #N of FIG. 1) through the HUB 20 or directly transmitted to the RUs 40. Each RU 40 separates the combined relay signal transmitted from the MU 20 for each frequency band and performs signal processing (analog signal processing in the analog DAS and digital signal processing in the digital DAS). Accordingly, each RU 40 transmits a relay signal to a user terminal in its own service coverage through a service antenna. A specific functional configuration of the RU 40 will be described in detail below with reference to FIG. 2.

In FIG. 1, it is illustrated that the BTS and the BIU 10 are connected to each other through an RF cable, the BIU 10 and the MU 20 are connected to each other through an RF cable, and all units from the MU 20 to a lower node unit thereof are connected to each other through optical cables. However, a signal transport medium between node units may be variously modified. As an example, the BIU 10 and the MU 20 may be connected through an RF cable, but connected through an optical cable or a digital interface. As another example, the MU 20, HUB 30, and the RU 40 directly connected to the MU 20 may be connected to each other through optical cables, and the cascade-connected RUs 40 may be connected to each other through an RF cable, a twist cable, a UTP cable, etc. As still another example, the RU 40 directly connected to the MU 20 may also connected to the MU 20 through an RF cable, a twist cable, a UTP cable, etc.

Hereinafter, this will be described based on FIG. 1. Therefore, in this embodiment, each of the MU 20, the HUB 30, and the RU 40 may include an optical transceiver module for transmitting/receiving optical signals through electro-optic conversion/photoelectric conversion. When connection between node units is made through a single optical cable, each of the MU 20, the HUB 30, and the RU 40 may include a wavelength division multiplexing (WDM) element. This will be clearly understood through functional description of the RU 20 in FIG. 2 to be described later.

The DAS may be connected, through a network, an external management device (e.g., a network management server or system (NMS) of FIG. 1). Accordingly, a manager can remotely monitor a status and problem of each node unit in the DAS and remotely control an operation of each node unit through the NMS.

Figure 2:
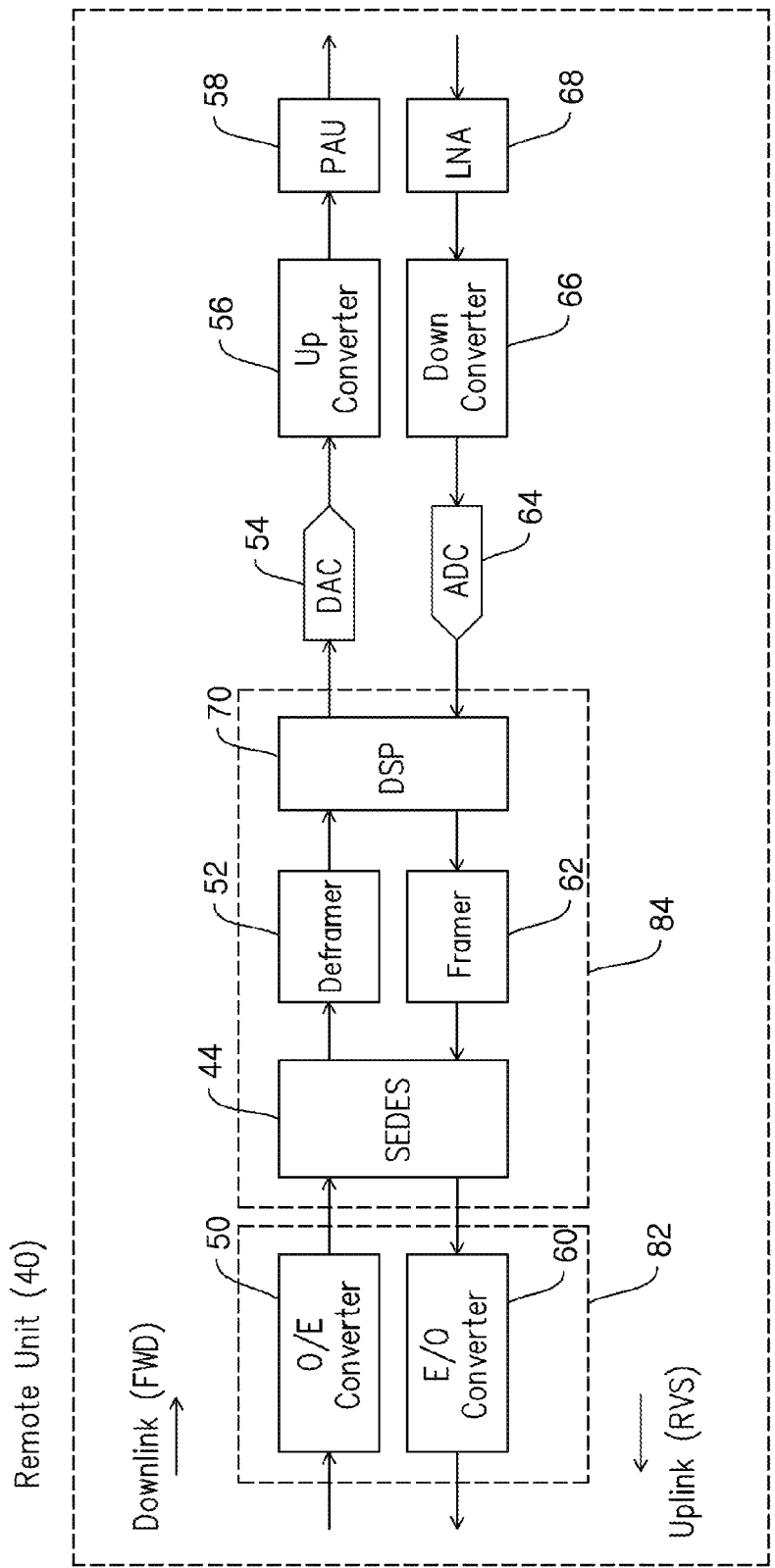
FIG. 2 is a block diagram illustrating an embodiment of a remote unit in the distributed antenna system to which the inventive concept is applicable.

FIG. 2 is a block diagram illustrating an embodiment of an RU in the DAS to which the inventive concept is applicable.

Here, the block diagram of FIG. 2 illustrates an implementation form of the RU 40 in the digital DAS in which connection between node units is made through an optical cable. In addition, the block diagram of FIG. 2 illustrates only components related to a function of providing service signals to a terminal in a service coverage through a forward path and processing terminal signals received from the terminal in the service coverage through a reverse path.

As described above, a node unit to which the delay measuring method according to the embodiment of the inventive concept is applicable may vary, including the hub unit (see reference numeral 30 of FIG. 1), the RRH in the base station distributed system, etc., in addition to the remote unit to be described later. Hereinafter, for convenience of illustration, a remote unit in the DAS will be assumed and described.

Referring to FIG. 2, the RU 40, based on a downlink signal transmission path (i.e., a forward path), includes an optical to electrical (O/E) converter 50, a serializer/deserializer (SERDES) 44, a deframer 52, a digital signal processor (DSP) 70, a digital/analog converter (DAC) 54, an up converter 56, and a power amplification unit (PAU) 58.

Accordingly, in the forward path, an optical relay signal digital-transmitted through an optical cable is converted into an electrical signal (serial digital signal) by the O/E converter 50, the serial digital signal is converted into a parallel digital signal by the SERDES 44, and the parallel digital signal is reformatted by the deframer 52 to be processed for each frequency band in the DSP 70. The DSP 70 performs functions including digital signal processing on relay signals for each frequency band, digital filtering, gain control, digital multiplexing, etc. The digital signal passing through the DSP 70 is converted into an analog signal via the DAC 54 constituting the final node unit of a digital part 84. In this case, the analog signal is an IF, and hence frequency up-converted into an analog signal in the original RF band through the up converter 56. The frequency up-converted analog signal (i.e., the RF signal) in the original RF band is amplified via the PAU 58 to be transmitted through a service antenna (not shown).

The RU 40, based on an uplink signal transmission path (i.e., a reverse path), includes a low noise amplifier (LNA) 68, a down converter 66, an analog/digital converter ADC 64, the DSP 70, a framer 62, the SERDES 44, and an electrical to optical (E/O) converter 60.

Accordingly, in the reverse path, an RF signal (i.e., a terminal signal) received through the service antenna (not shown) from a user terminal (not shown) in a service coverage is low-noise amplified by the LNA 68, the low-noise amplified signal is frequency down-converted into an IF signal by the down converter 66, and the converted IF signal is converted into a digital signal by the ADC 64 to be transmitted to the DSP 70. The digital signal passing through the DSP 70 is formatted in a format suitable for digital transmission through the framer 62, the formatted digital signal is converted into a serial digital signal by the SERDES 44, and the serial digital signal is converted into an optical digital signal by the E/O converter 60 to be transmitted to an upper node unit through an optical cable.

Although not clearly shown in FIG. 2, in the state in which the RUs 40 are cascade-connected to each other as shown in FIG. 1, the following method may be used when a relay signal transmitted from an upper node unit among the RUs 40 is transmitted to a lower adjacent node unit cascade-connected to the upper node unit. For example, when an optical relay signal digital-transmitted from an upper node unit is transmitted to a lower adjacent node unit cascade-connected to the upper node unit, the optical relay signal digital-transmitted from the upper node unit may be transmitted to the lower adjacent node unit in an order of the O/E converter 50→the SERDES 44→the deframer 52→the framer 62→the SERDES 44→the E/O converter 60. This will be clearly understood through FIG. 4 to be described later.

In FIG. 2, the SERDES 44, the deframer 52, the framer 62, and the DSP 70 may be implemented as a field programmable gate array (FPGA). In FIG. 2, it is illustrated that the SERDES 44 and the DSP 70 are commonly used in the downlink and uplink signal transmission paths. However, the SERDES 44 and the DSP 70 may be provided for each path. In FIG. 2, it is illustrated that the O/E converter 50 and the E/O converter 60 are separately provided. However, the O/E converter 50 and the E/O converter 60 may be implemented as a single optical transceiver module (e.g., a single small form factor pluggable (SFP) (see reference numeral 82 of FIG. 2)).

In the above, a form of the topology of the DAS and an example of the configuration of the RU have been described. Particularly, the RU in the digital DAS in which signals are digital-transmitted through the transport medium has been mainly described in FIG. 2. However, the delay measuring method according to the embodiment of the inventive concept may be applied to an analog transmission system such as an analog DAS (i.e., a DAS in which signals are analog-transmitted through a transport medium), as well as the digital DAS. Also, the delay measuring method according to the embodiment of the inventive concept may be applied to a case where analog RF relays or digital RF relays are cascade-connected to each other, as a case of signal distributed transmission. In addition, the delay measuring method according to the embodiment of the inventive concept may be applied to various cases where node units in a master-slave relationship are connected to each other. Hereinafter, for convenience of illustration, a case where the delay measuring method according to the embodiment of the inventive concept is applied to RUs in the digital DAS will be mainly described.

Before detailed description of this (see FIG. 5), in order to help clear understanding of the delay measuring method according to the embodiment of the inventive concept, a conventional related art will be first described with reference to FIG. 3.

Figure 3:
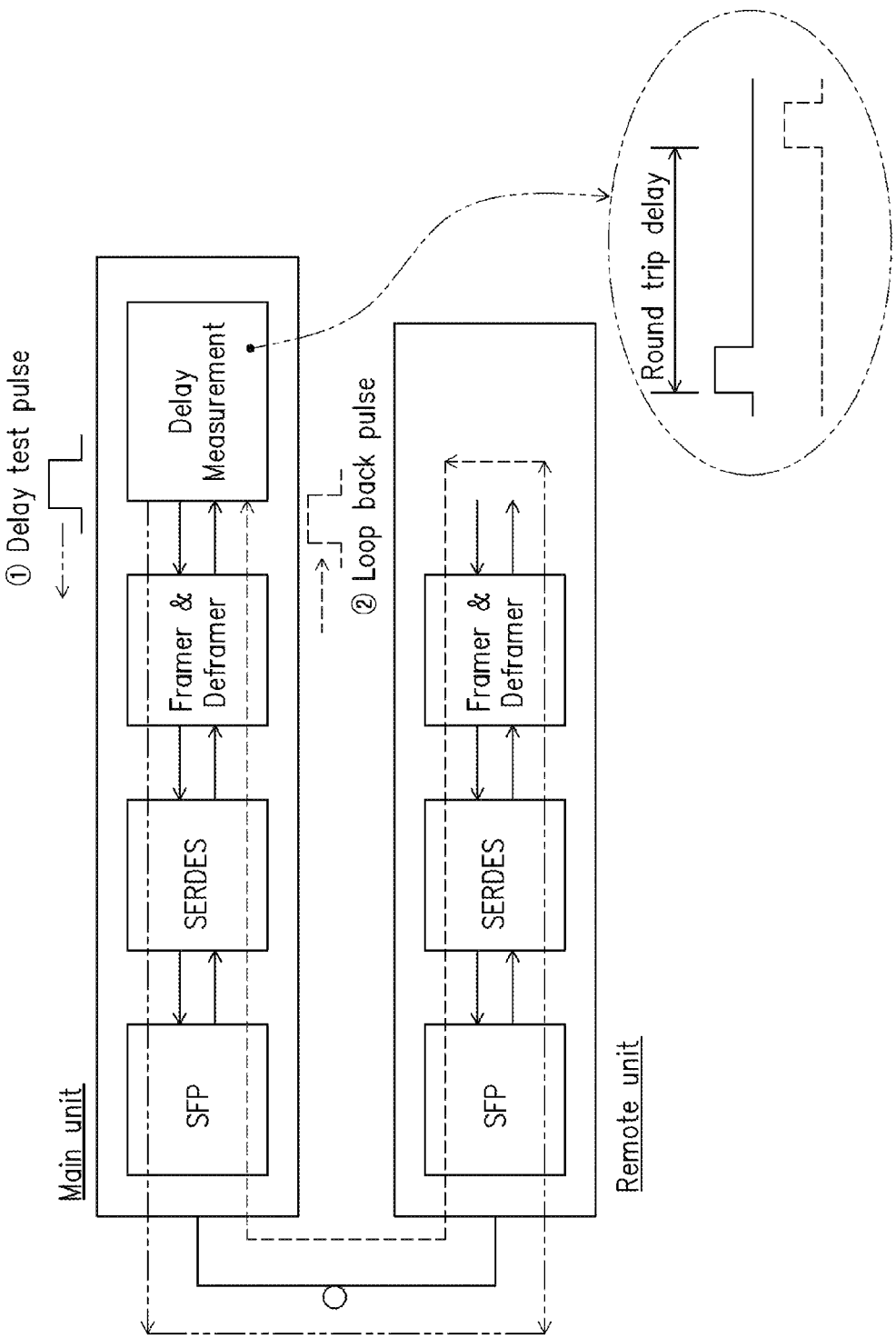
FIG. 3 is a diagram illustrating a transmission delay measuring method of a related art compared with an embodiment of the inventive concept.

FIG. 3 is a diagram illustrating a transmission delay measuring method of a related art compared with the embodiment of the inventive concept.

Referring to FIG. 3, as the transmission delay measuring method according to the conventional art, there is generally used a method of generating a test signal for delay measurement from a main unit, transmitting the generated test signal to a lower remote unit branch-connected to the main unit, and detecting a loop-back pulse looped back via the lower remote unit, thereby measuring a transmission delay, based on a time delay between the test signal and the loop-back pulse (i.e., see a round trip delay of FIG. 3).

When a plurality of remote units cascade-connected to each other exist on the same branch as the main unit, there is used a method of transmitting a delay measurement signal from the main unit to the remote units and measuring each delay by using a pulse looped back via a corresponding remote unit.

If a delay from the main unit to each remote unit is measured by the above-described method, the main unit transmits, to each remote unit, a delay compensation value necessary for delay compensation, so that the delay compensation is made for each remote unit.

On the other hand, in the embodiment of the inventive concept, only the measurement of a delay between a node unit and an upper adjacent node unit among a plurality of node units branch-connected to a main unit (i.e., a headend unit) is performed, so that delay measurement or/and delay compensation is made. In the following description of FIG. 5, it will be clearly understood that the method according to the embodiment of the inventive concept is distinguished from the method of FIG. 3.

Figure 4:
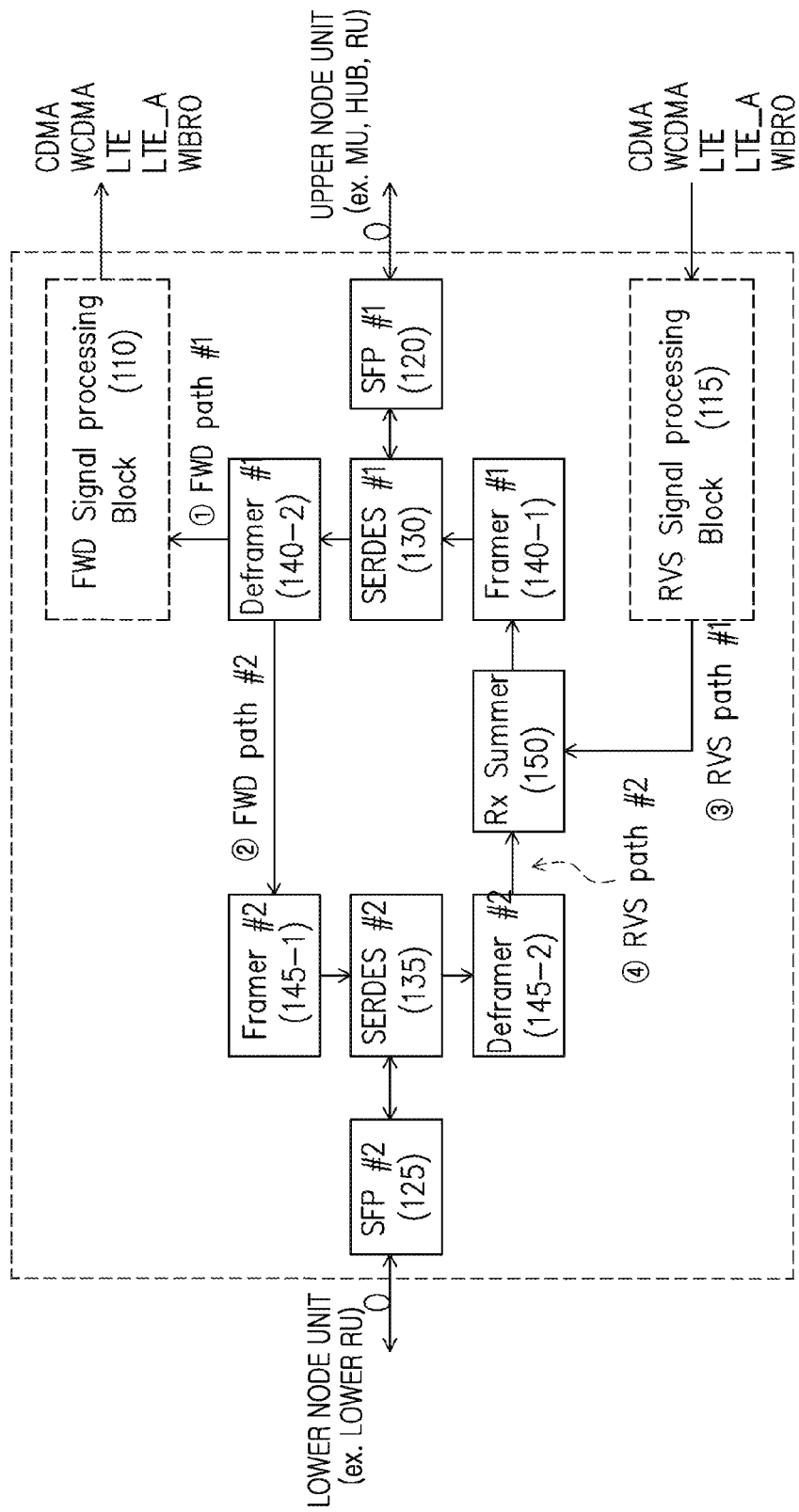
FIG. 4 is a block diagram illustrating a general signal transmission path between upper and lower node units, based on a specific node unit in the distributed antenna system to which the inventive concept is applicable.

FIG. 4 is a block diagram illustrating a general signal transmission path between upper and lower node units, based on a specific node unit in the distributed antenna system to which the inventive concept is applicable.

In FIG. 2, the components related to path for transmitting or receiving signals through the service antenna and their functions have been described. On the other hand, components related to a path for transmitting/receiving signals in a relationship with an upper node unit or transmitting/receiving signals in a relationship with a lower node unit and their functions are mainly described in FIG. 4.

In FIG. 4, it is assumed that the specific node unit is connected to the upper and lower node units through an optical cable. However, as described in FIG. 1, the transport medium used in the connection between the node units may vary. When the optical cable is not used, SFP #1 120 and SFP #2 125 of FIG. 4 may be omitted. In FIG. 4, it is assumed that signals are digital transmitted through the transport medium, but the signal transmission method between node units through the transport medium is not limited thereto. When an analog transmission method is employed rather than a digital transmission method, framers 140-1 and 145-1, deframers 140-2 and 145-2, and SERDESs 130 and 135 may also be omitted, and replaced with other components for analog transmission. Hereinafter, this will be described based on FIG. 4. Here, a case where the node unit of FIG. 4 is a remote unit in the DAS will be described as an example (see FIG. 1).

In FIG. 4, forward path #1 is a signal transmission path through which a mobile communication signal transmitted from an upper node unit of a corresponding remote unit is provided to a terminal in a service coverage through a service antenna (not shown). Thus, the forward path #1 of FIG. 4 is substantially identical to the forward path of FIG. 2. In the case of the forward path #1, a mobile communication signal digital-transmitted from an upper node unit through a transport medium (in this example, an optical line) is optical-to-electrical converted via the SFP #1 120, the converted signal is converted into a parallel digital signal via the SERDES #1 130, the converted digital signal is reformatted via the deframer #1 140-2, and the reformatted digital signal is input to a forward signal processing block 110. After the digital signal transmitted from the forward signal processing block 110 is processed, the processed digital signal is converted into an RF signal in a frequency ban corresponding to each original mobile communication protocol, and the converted RF signal is transmitted to the terminal in the service coverage through the service antenna (not shown).

In this case, when there exists an adjacent remote unit branch-connected (i.e., cascade-connected) to corresponding remote unit as a lower node unit thereof, the mobile communication signal digital-transmitted from the upper node unit may be transmitted to the lower node unit through forward path #2 of FIG. 4. The forward path #2 is a signal transmission path through which the mobile communication signal digital-transmitted from the upper node unit is transmitted to the lower node unit through the transport medium via the SFP #1 120, the SERDES #1 130, the deframer #1 140-2, the framer #2 145-1, the SERDES #2 135, and the SFP #125.

In FIG. 4, reverse path #1 is a signal transmission path through which the mobile communication signal received from the terminal in the service coverage through the service antenna (not shown) of the corresponding remote unit is transmitted to the upper node unit (finally transmitted to a base station). Thus, the reverse path #1 of FIG. 4 is substantially identical to the reverse path of FIG. 2. In the case of the reverse path #1, the mobile communication signal received through the service antenna (not shown) is subjected to low noise amplification, frequency down-conversion, digital conversion, digital signal processing, etc., and then input to a reverse signal combiner (Rx summer) 150. However, when the corresponding remote unit is a branch termination node unit, the digital signal passing through the reverse signal processing block 115 may be immediately input to the framer #1 140-1.

The Rx summer 150 combines a digital signal input through the reverse path #1 and a digital signal input through reverse path #2. Here, the reverse path #2 of FIG. 4 is a signal transmission path through which, when another remote unit exists at the lower node unit of the corresponding remote unit, a reverse digital signal transmitted from the lower node unit is transmitted. A mobile communication signal subjected to optical digital transmission from the lower node unit is optical-to-electrical converted by the SFP #2 125, and the converted signal is input to the Rx summer 150 via the SERDES #2 135 and the deframer #2 145-2.

The reverse digital signal signal-combined by the Rx summer 150 is transmitted to the upper node unit through the transport medium via the framer #1 140-1, the SERDES #1 130, and the SFP #1 120. The reverse digital signal is finally transmitted to the base station.

Hereinafter, for convenience of illustration, the framer #1 140-2, the deframer #1 140-2, the SERDES #1 130, and the SFP #1 120 of FIG. 4 are components related to the signal transmission path of signals to be received from the upper node unit or transmitted to the upper node unit, and hence called "upper interface components." Similarly, the framer #2 145-1, the deframer #2 145-2, the SERDES #2 135, and the SFP #2 125 of FIG. 4 are components related to the signal transmission path of signals to be received from the lower node unit or transmitted to the lower node unit, and hence called "lower interface components."

This will be clearly understood through description of FIG. 5 to be described below. However, according to the case of digital optical transmission, the upper interface components (i.e., the framer #1 140-2, the deframer #1 140-2, the SERDES #1 130, and the SFP #1 120 of FIG. 4) participate in the signal transmission of a test signal to be transmitted from the corresponding node unit to the upper node unit and then looped back for the purpose of delay measurement. Also, the lower interface components (i.e., the framer #2 145-1, the deframer #2 145-2, the SERDES #2 135, and the SFP #2 125 of FIG. 4) participate in the signal transmission of a test signal to be transmitted from the lower node unit to the corresponding node unit and then looped back for the purpose of delay measurement.

Figure 5:
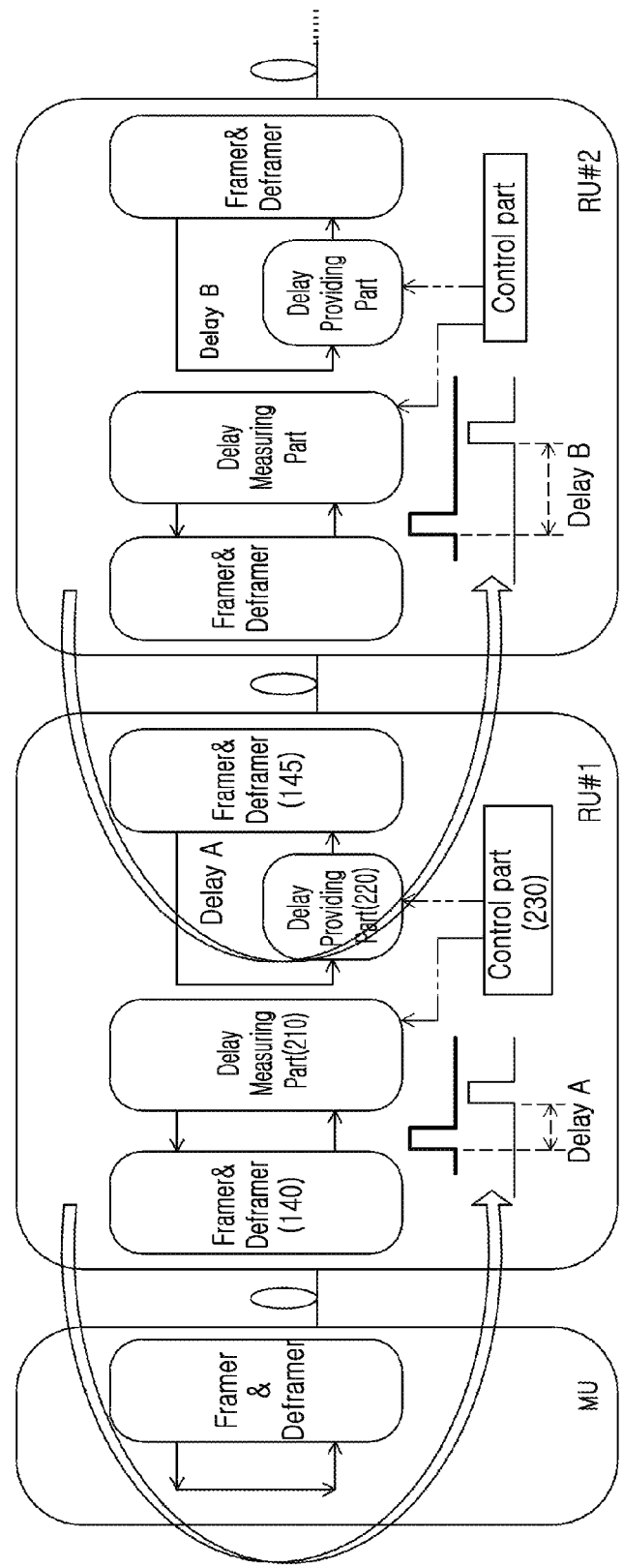
FIG. 5 is a diagram illustrating a node unit capable of measuring a delay and a distributed antenna system including the same according to an embodiment of the inventive concept.

FIG. 5 is a diagram illustrating a node unit capable of measuring a delay and a DAS including the same according to an embodiment of the inventive concept.

Hereinafter, for convenience of illustration, components related to the delay measuring method according to the embodiment of the inventive concept will be first described based on RU #1 of FIG. 5, and the delay measuring method performed by totally considering lower node units branch-connected to the RU #1 will be described.

In the delay measuring method according to the embodiment of the inventive concept, the RU #1 includes a delay measuring part 210, a delay providing part 220, and a control part 230. According to the case of digital transmission through a transport medium, the delay measuring part 210, the delay providing part 220, and the control part 230 may be implemented in a digital part in the RU #1, and implemented in a single FPGA. It will be apparently understood by those skilled in the art that other modifications are possible.

In order to perform delay measuring method according to the embodiment of the inventive concept, the delay measuring part 210 transmits a test signal for delay measurement to an adjacent node unit (here, an MU constituting a headend unit) branch-connected to a corresponding node unit (here, the RU #1) through the transport medium.

In FIG. 5, it is illustrated that the test signal for delay measurement is a test pulse that is a single pulse. However, it will be apparent that various modifications are possible. For example, the test signal may be a test pulse having a specific bit pattern, and an encoded modulation signal corresponding to a mobile communication signal (obtained by reproducing a mobile communication signal) to be actually serviced may be used as the test signal. For example, since service time synchronization is important in an OFDM-based signal, a test signal obtained by reproducing a corresponding OFDM-based signal (e.g., LTE, WIBRO, etc.) in which delay measurement is required may be used as the test signal. Also, the test signal may be used to measure a transmission delay caused by the transport medium for each corresponding service frequency band by being carried in a use frequency band of a corresponding mobile communication service and transmitted to an upper node unit.

Here, the delay measuring part 210 functions to measure a transmission delay specialized for a transport medium (or/and interface components on a signal transmission path for performing signal transmission through the transport medium), such as a characteristic of the transport medium, an installation length of the transport medium, or an installation path of the transport medium. In FIG. 5, the case of digital optical transmission is illustrated, and hence an SFP, a SERDES, a framer, and a deframer may correspond to the interface components for performing signal transmission through the corresponding transport medium (in FIG. 5, an optical cable) (see description of FIG. 4). Thus, a case where the delay measuring part 210 is disposed at the rear of a framer/deframer 140 constituting a termination of upper interface components is illustrated in FIG. 5. However, it will be apparent that the position of the delay measuring part 210 may be variously modified.

The test signal transmitted to the upper node unit (i.e., the MU) by the delay measuring part 210 is looped back to the RU #1 via a framer/deframer of the upper node unit through the transport medium. The delay measuring part 210 detects a looped-back signal (hereinafter, referred to as a 'loop-back signal'), to measure a transmission delay between the MU and the RU #1 (more clearly, a round trip delay).

If it is assumed that a round trip delay between the MU and the RU #1, measured in the RU #1, is delay A as illustrated in FIG. 5, the transmission of a mobile communication signal between the MU and the RU #1 is performed in a single direction (i.e., a forward or reverse direction), and therefore, an actual signal transmission delay through the transport medium may be approximately ½ of the round trip delay. However, the method of calculating the actual transmission delay from the round trip delay is experimentally, statistically, and mathematically determined, including various additional factors provided by a system designer, and therefore, its detailed description will be omitted.

The delay measurement performed through the delay measuring part 210 may be started according to a delay measurement start signal transmitted from the headend unit or the NMS of FIG. 1. For example, the control part 230 of the RU #1 may receive a delay measurement start signal transmitted from the headend unit or the NMS, control the delay measuring part 210 such that delay measurement is started according to the received delay measurement start signal. In this case, the delay measurement start signal may be transmitted through a control & management (C&M) channel or through a downlink data channel of the mobile communication signal.

Also, the delay measurement start signal may be simultaneously transmitted to a plurality of node units connected on the same branch as the headend unit (MU of FIG. 5). However, the delay measurement start signal may be sequentially transmitted to the plurality of node units. For example, the delay measurement start signal may be sequentially transmitted in such a manner that the delay measurement start signal is first transmitted a node unit (i.e., a node unit constituting a start point in a corresponding branch) connected directly to the headend unit, transmitted to a next node unit, and then transmitted to a next node unit.

In this case, the sequential transmission of the delay measurement start signal may be performed under direct control of the headend unit or the NMS. However, the sequential transmission of the delay measurement start signal may be performed in such a manner that the node unit first receiving the delay measurement start signal completes the above-described delay measuring process (more accurately, completes all processes up to a delay providing process performed by the delay providing part 220, which will be described later) and then transmits the delay measurement start signal to a lower adjacent node unit. Alternatively, the transmission of the delay measurement start signal from the headend unit or the NMS may be performed on only a branch start node unit, and after the delay measuring process in the corresponding node unit is completed, a control part (see reference numeral 230 of FIG. 5) of the corresponding node unit may generate a delay measurement start signal and transmit the generated delay measurement start signal to the lower adjacent node unit.

In the above, it has been described that the delay measurement start signal is first generated and then transmitted to the lower node unit. However, it will be apparent that other modifications are possible. For example, the delay measurement in a corresponding node unit may be previously set to start in a specific time zone. Alternatively, the delay measurement in a corresponding node unit may be may be started under control of a field worker.

As described above, if a round trip delay (see delay A of FIG. 5 in the case of the RU #1) caused by the transport medium in a relationship between the corresponding node unit and the upper adjacent node unit is measured by the delay measuring part 210, the control part 230 sets a delay value such that a delay corresponding to the measured round trip delay is provided by the delay providing part 220.

The delay providing part 220 is disposed on a signal transmission path through which a test signal for delay measurement, to be transmitted from a lower adjacent node unit (here, RU #2) branch-connected to the corresponding node unit (here, the RU #1), is to be looped back to the lower adjacent node unit. That is, in FIG. 5, the delay providing part 220, based on the corresponding loop-back path, is disposed at the rear of a framer/deframer 145 constituting a termination of the lower interface components branch-connected to the lower node unit through the transport medium. In this case, it will be apparent that the position of the delay providing part 220 may be variously modified.

The delay providing part 220 is disposed on the signal transmission path through which the test signal is to be transmitted from the lower adjacent node unit and then looped back, so that a delay is forcibly provided in the loop-back process of the test signal transmitted from the delay measuring part built in the lower adjacent node unit (here, the RU #2).

Referring to FIG. 5, the delay A that is the round trip delay through the transport medium between the MU and the RU #1, previously measured by the delay measuring part 210, is forcibly provided to the delay providing part 220 of the RU #1. Accordingly, although only the delay measurement is performed according to the loop-back signal transmission path through the transport medium between the RU #2 and the RU #1 that is an adjacent upper node unit, it is possible to measure a round trip delay (i.e., a round trip delay in the entire transport medium interposed between the RU #2 and the MU that is a headend unit, see delay B of FIG. 5) to which the round trip delay (i.e., the delay A) caused by the transport medium between the MU and RU #1 is reflected. The round trip delay (i.e., the delay B) measured by a delay measuring part of the RU #2 is applied by a delay providing part of the corresponding node unit. The delay B is reflected to delay measurement in a lower node unit of the RU #2. This process is repeatedly performed on node units up to a node unit constituting a termination in the same branch in the same manner.

Thus, in the delay measuring method according to the embodiment of the inventive concept, a round trip delay caused by a transport medium between a corresponding node unit in node units branch-connected to each other and an upper node unit directly connected (adjacent) thereto is measured, so that it is possible to measure the entire round trip delay from the corresponding node unit subjected to the delay measurement to a headend unit. To this end, the above-described components for transmission delay measurement, including the delay measuring part 210, the delay providing part 220, and the control part 230, may be built in each node unit branch-connected to the headend unit.

While the inventive concept has been described with respect to the specific embodiments, it will be apparent to those skilled in the art that various changes and modifications may be made without departing from the spirit and scope of the inventive concept as defined in the following claims.

What is claimed is:

1. A node unit of distributed antenna system, the node unit comprising:
   a delay measuring part configured to transmit a first test signal to an upper adjacent node unit and detect the first test signal looped back via the upper adjacent node unit and measure a first round trip delay with respect to the upper adjacent node unit based on the first test signal; and
   a delay providing part disposed on a signal transmission path through which a second test signal, transmitted from a lower adjacent node unit, is to be looped back to the lower adjacent node unit, and configured to provide a delay corresponding to the first round trip delay to the second test signal,
   wherein the second test signal is used for measuring a second round trip delay between the lower adjacent node unit and the node unit by the lower adjacent node unit.

2. The node unit of claim 1, wherein the node unit is a node unit connected to a main unit of the distributed antenna system.

3. The node unit of claim 2, wherein the node unit is any one remote unit among a plurality of first remote units connected to the main unit or a hub unit connected to the main unit to distribute the mobile communication signals to a plurality of second remote units connected the hub unit.

4. The node unit of claim 2, further comprising a first framer/deframer for transmitting and receiving signals between the node unit and the upper adjacent node unit,
wherein the delay measuring part configured to detect the first test signal looped back from the upper adjacent node unit through the first framer/deframer.

5. The node unit of claim 4, further comprising a second framer/deframer for transmitting and receiving signals between the node unit and the lower adjacent node unit,
wherein the delay providing part configured to provide the delay to the second test signal through the second framer/deframer.

6. The node unit of claim 2, further comprising a control part configured to set a value of the delay in accordance with a value of the measured first round trip delay.

7. The node unit of claim 6, wherein the control part receives a first delay measurement start signal from the upper adjacent node unit, and controls measurement for the first round trip delay to be started through the delay measuring part in response to the received first delay measurement start signal.

8. The node unit of claim 7, wherein, after the measuring of the first round trip delay through the delay measuring part and the providing of the delay to the second test signal through the delay providing part are completed, the control part transmits the received first delay measurement start signal to the lower adjacent node unit.

9. The node unit of claim 6, wherein, after the measuring of the first round trip delay through the delay measuring part and the providing of the delay to the second test signal through the delay providing part are completed, the control part generates a second delay measurement start signal instructing the start of the second round trip delay measurement at the lower adjacent node unit, and transmits the generated delay measurement start signal to the lower adjacent node unit.

10. A distributed antenna system comprising:
a main unit; and
a plurality of node units connected to the main unit,
wherein each of the plurality of node units includes:
a delay measuring part configured to transmit a first test signal to an upper adjacent node unit and detect the first test signal looped back via the upper adjacent node unit and measure a first round trip delay with respect to the upper adjacent node unit based on the first test signal; and
a delay providing part disposed on a signal transmission path through which a second test signal, transmitted from a lower adjacent node unit, is to be looped back to the lower adjacent node unit, and configured to provide a delay corresponding to the first round trip delay to the second test signal,
wherein the second test signal is used for measuring a second round trip delay between the lower adjacent node unit and the node unit by the lower adjacent node unit.

11. The distributed antenna system of claim 10, wherein each of the plurality of node units further includes a first framer/deframer for transmitting and receiving signals between the node unit and the upper adjacent node unit,
wherein the delay measuring part configured to detect the first test signal looped back from the upper adjacent node unit through the first framer/deframer.

12. The distributed antenna system of claim 11, wherein each of the plurality of node units further includes a second framer/deframer for transmitting and receiving signals between the node unit and the lower adjacent node unit,
wherein the delay providing part configured to provide the delay to the second test signal through the second framer/deframer.

13. The distributed antenna system of claim 10, wherein each of the plurality of node units further includes a control part configured to set a value of the delay in accordance with a value of the measured first round trip delay.

14. The distributed antenna system of claim 13, wherein the control part receives a delay measurement start signal from the upper adjacent node unit, and controls measurement for the first round trip delay to be started through the delay measuring part in response to the received delay measurement start signal.

15. The distributed antenna system of claim 14, wherein, after the measuring of the first round trip delay through the delay measuring part and the providing of the delay to the second test signal through the delay providing part are completed, the control part transmits the received delay measurement start signal to the lower adjacent node unit.

* * * * *